United States Patent
Nakayama et al.

[11] Patent Number: 5,487,142
[45] Date of Patent: Jan. 23, 1996

[54] ANTI-ALIASING LINE DISPLAY APPARATUS

[75] Inventors: Noriko Nakayama; Hiroshi Nakayama, both of Kawasaki, Japan

[73] Assignee: Fujitsu Limited, Kawasaki, Japan

[21] Appl. No.: 184,153

[22] Filed: Jan. 21, 1994

[30] Foreign Application Priority Data

Mar. 19, 1993 [JP] Japan .................................. 5-059918

[51] Int. Cl.$^6$ .................................................. G06F 15/16
[52] U.S. Cl. .................................................. 395/143
[58] Field of Search ..................... 395/140, 141, 395/142, 143; 345/136, 137, 138

[56] References Cited

U.S. PATENT DOCUMENTS

| | | | |
|---|---|---|---|
| 5,265,210 | 11/1993 | Vatti et al. | 395/143 |
| 5,287,442 | 2/1994 | Alcorn et al. | 395/143 |
| 5,333,250 | 7/1994 | Staley, II et al. | 395/143 |

*Primary Examiner*—Phu K. Nguyen
*Attorney, Agent, or Firm*—Nikaido, Marmelstein, Murray & Oram

[57] ABSTRACT

An anti-aliasing line display apparatus includes an input device for inputting a coordinate and an attribute of an input straight line which is to be displayed, a judging device for judging a width and a slope of the input straight line, an analyzing device for decomposing the input straight line into individual pixels and setting a drawing pixel to be drawn, a distance calculating device for calculating a distance from a center of the drawing pixel set by the analyzing means to the input straight line, an occupying ratio calculating means for calculating an occupying ratio of the input straight line with respect to the drawing pixel based on the distance calculated by the distance calculating device, a frame buffer, a blending device for blending the color of the drawing pixel and a color input in the frame buffer in advance based on the occupying ratio and for writing the blended color in the frame buffer, and a display device for displaying the input straight line based on the color of the drawing pixel written in the frame memory.

11 Claims, 9 Drawing Sheets

WIDTH = 1              WIDTH = W

WIDTH = 1

WIDTH = W

ANTI-ALIASING LINE DISPLAY APPARATUS

BACKGROUND OF THE INVENTION

The present invention generally relates to anti-aliasing line display apparatuses, and more particularly to an anti-aliasing line display apparatus which is used to make a graphic display of a straight line.

Recently, it has become more popular to generate three-dimensional images on a computer. The users tend to demand more realistic or graphic images, and the problem is whether or not the generated images actually appear realistic. On the other hand, there are strong demands to realize real-time processing.

Aliasing is a phenomenon where a contour line of an object or a boundary line of patterns on the object become jagged on the generated image. In other words, the contour line and the boundary line become stepped. The deterioration of the image caused by this aliasing is particularly notable when the contour line or the boundary line of the image is a straight line.

Accordingly, there are demands to realize a process of effectively eliminating the aliasing. That is, there are demands to realize an apparatus which can positively carry out an anti-aliasing process at a high speed.

Even if a computer generates an image having a high quality by carrying out a three-dimensional image processing, the quality of the image which is displayed is determined by the resolution of a display device which displays the generated image. Generally, the display device used for computer graphics must display the image using a group of a finite number of pixels, and the aliasing is inevitably generated. Due to this aliasing, the displayed line appears jagged or the displayed line may be broken at an intermediate point.

The quality of the displayed image greatly deteriorates when the aliasing is generated, and the anti-aliasing process is carried out to eliminate the aliasing. Conventionally, one of three kinds of anti-aliasing techniques is generally employed.

1) Super Sampling Technique

With respect to the color of one pixel in a frame buffer, a frame buffer having finer pixels than the actual frame buffer is imagined. For example, the finer pixels are obtained by dividing one pixel into nine divisions. According to this technique, the color calculation is made for each of the finer pixels, and an average value of the colors of the plurality of finer pixels corresponding to one pixel in the actual frame buffer is obtained.

2) Filtering Technique

With respect to the color of one pixel in the frame buffer, an average value of the colors of a plurality of pixels neighboring this one pixel is obtained. According to this technique, it is possible to prevent the colors of the adjacent pixels from greatly changing, and as a result, the generation of the aliasing is prevented.

3) Z Buffer Technique

This technique is a modification of the filtering technique. In other words, a differentiating filter is used for a Z buffer, and an averaging filter is applied only to the pixels (edges) which are detected as having discontinuity in the depth. According to this technique, when displaying an image having overlapping objects, it is possible to smoothly display the overlapping boundary portions.

However, according to each of the conventional techniques described above, the color to be displayed is determined by carrying out an averaging process. For this reason, the color to be displayed is not accurately calculated, and there was a problem in that it is impossible to display a smooth straight line. As a result, it was impossible to positively prevent the generation of the aliasing, and the displayed image deteriorated.

If the aliasing is not accurately eliminated when displaying a straight line, the jaggedness becomes particularly notable.

SUMMARY OF THE INVENTION

Accordingly, it is a general object of the present invention to provide a novel and useful anti-aliasing line display apparatus in which the problems described above are eliminated.

Another and more specific object of the present invention is to provide an anti-aliasing line display apparatus comprising input means for inputting a coordinate and an attribute of an input straight line which is to be displayed, judging means for judging a width and a slope of the input straight line, analyzing means for decomposing the input straight line into individual pixels and setting a drawing pixel to be drawn, distance calculating means for calculating a distance from a center of the drawing pixel set by the analyzing means to the input straight line, occupying ratio calculating means for calculating an occupying ratio of the input straight line with respect to the drawing pixel based on the distance calculated by the distance calculating means, frame buffer means input with a color in advance, blending means for blending the color of the drawing pixel and the color input in the frame buffer means in advance based on the occupying ratio and for writing the blended color in the frame buffer means, and display means for displaying the input straight line based on the color of the drawing pixel written in the frame memory means.

According to the anti-aliasing line display apparatus of the present invention, the distance to the input straight line is calculated by the distance calculating means for the individual decomposed drawing pixel obtained by the analyzing means. The occupying ratio of the straight line with respect to the drawing pixel is calculated by the occupying ratio calculating means based on this distance, and the blending means blends the color of the drawing pixel and the color input in the frame buffer in advance based on the occupying ratio. Therefore, it is possible to draw a smooth straight line having a high quality.

Still another object of the present invention is to provide an anti-aliasing line display apparatus wherein, in addition to the pixels generated based on the input coordinate, the analyzing means additionally sets as the drawing pixel an adjacent pixel depending on the slope of the input straight line judged by the judging means, and the occupying ratio calculating means calculates the occupying ratio also with respect to the adjacent pixel.

According to the anti-aliasing line display apparatus of the present invention, the analyzing means additionally sets the adjacent pixel as the drawing pixel depending on the slope of the input straight line judged by the judging means, in addition to the pixels which are generated based on the input coordinate, and the blending is carried out by calculating the occupying ratio also with respect to the adjacent pixel. As a result, it is possible to carry out a smoother and more accurate anti-aliasing process.

A further object of the present invention is to provide an anti-aliasing line display apparatus described first above, wherein the occupying ratio calculating means includes a table which uses as an index the distance from the center of the drawing pixel to the input straight line and prestores the occupying ratio in correspondence with this distance. In this case, when obtaining the occupying ratio of the input straight line with respect to the drawing pixels based on the distance, a reference is made to the table. Hence, the calculation of the occupying ratio can be made within a short time. As a result, the time required for the anti-aliasing process can be reduced.

Another object of the present invention is to provide an anti-aliasing line display apparatus described first above, wherein the occupying ratio calculating means includes a plurality of tables based on the correspondence of the distance and the occupying ratio which differ depending on the width of the input straight line. In this case, the table to which a reference is made is switched depending on the width of the input straight line which is judged by the judging means. Hence, it is possible to prevent the color from thinning within a bold line due to the blending when the input straight line is the bold line. For this reason, it is possible to carry out a more accurate anti-aliasing process.

Other objects and further features of the present invention will be apparent from the following detailed description when read in conjunction with the accompanying drawings.

DESCRIPTION OF THE PREFERRED EMBODIMENTS

Figure 1:
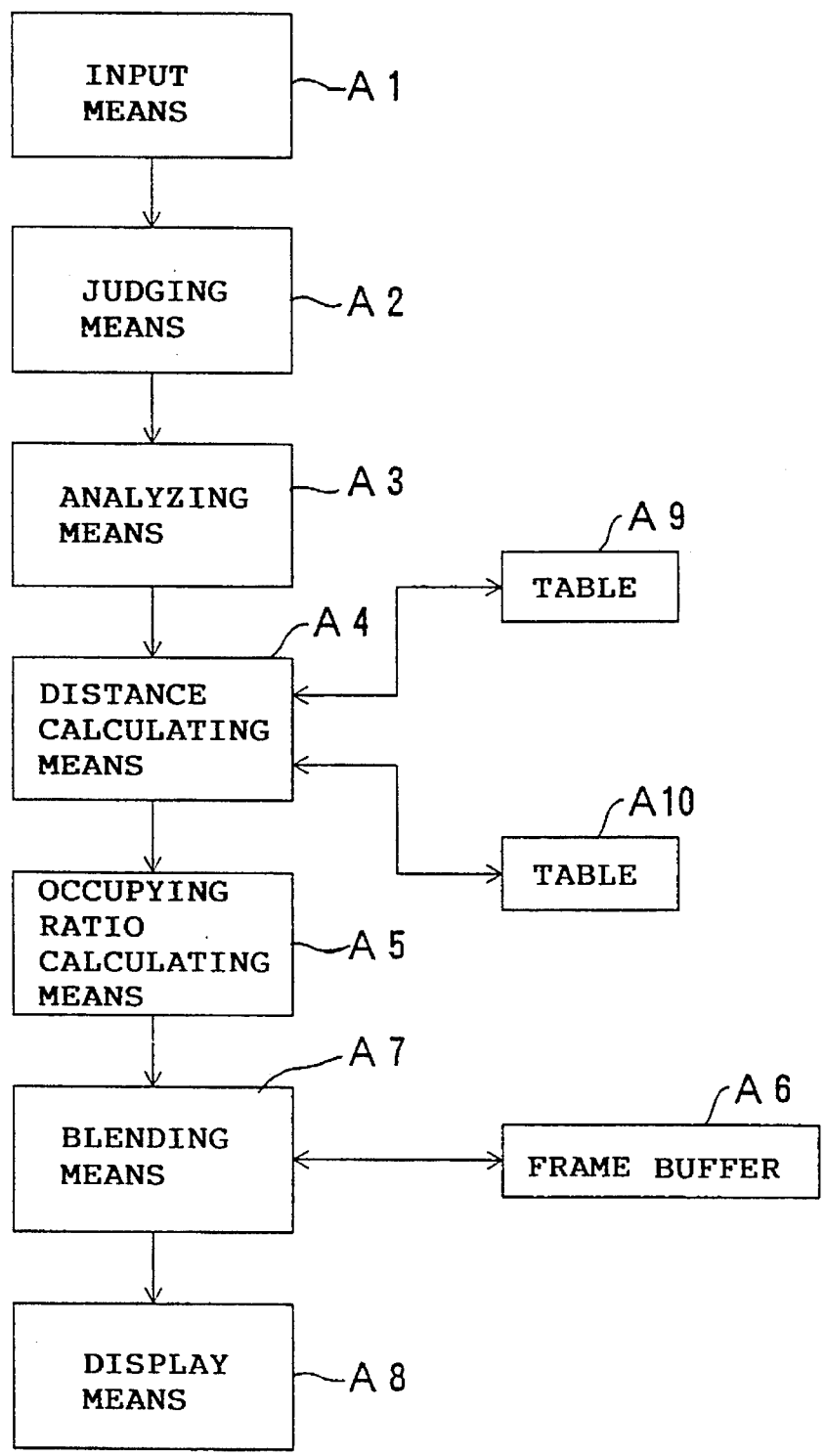
FIG. 1 is a system block diagram for explaining the operating principle of the present invention.

First, a description will be given of the operating principle of the present invention, by referring to FIG. 1.

An anti-aliasing line display apparatus according to the present invention includes an input means A1 for inputting a coordinate and an attribute of an input straight line which is to be displayed, a judging means A2 for judging a width and a slope of the input straight line, an analyzing means A3 for decomposing the input straight line into individual pixels and setting a drawing pixel to be drawn, a distance calculating means A4 for calculating a distance from a center of the drawing pixel set by the analyzing means A3 to the input straight line, an occupying ratio calculating means A5 for calculating an occupying ratio of the input straight line with respect to the drawing pixel based on the distance calculated by the distance calculating means A4, a frame buffer A6, a blending means A7 for blending the color of the drawing pixel and a color input in the frame buffer A6 in advance based on the occupying ratio and for writing the blended color in the frame buffer A6, and a display means A7 for displaying the input straight line based on the color of the drawing pixel written in the frame memory A6.

According to this anti-aliasing line display apparatus, the distance to the input straight line is calculated by the distance calculating means A4 for the individual decomposed drawing pixel obtained by the analyzing means A3. The occupying ratio of the straight line with respect to the drawing pixel is calculated by the occupying ratio calculating means A5 based on this distance, and the blending means A7 blends the color of the drawing pixel and the color input in the frame buffer A6 in advance based on the occupying ratio. Therefore, it is possible to draw a smooth straight line having a high quality.

In addition to the pixels generated based on the input coordinate, the analyzing means A3 may additionally set as the drawing pixel an adjacent pixel depending on the slope of the input straight line judged by the judging means A2, and the occupying ratio calculating means A5 may calculate the occupying ratio also with respect to the adjacent pixel.

In this case, the analyzing means A3 additionally sets the adjacent pixel as the drawing pixel depending on the slope of the input straight line judged by the judging means A2, in addition to the pixels which are generated based on the input coordinate, and the blending is carried out by calculating the occupying ratio also with respect to the adjacent pixel. As a result, it is possible to carry out a smoother and more accurate anti-aliasing process.

On the other hand, the occupying ratio calculating means A5 may include a table A9, A10 which uses as an index the distance from the center of the drawing pixel to the input straight line, and prestores the occupying ratio in correspondence with this distance. In this case, when obtaining the occupying ratio of the input straight line with respect to the drawing pixels based on the distance, a reference is made to the table A9, A10.

In this case, the calculation of the occupying ratio can be made within a short time. As a result, the time required for the anti-aliasing process can be reduced.

Furthermore, the occupying ratio calculating means A5 may include a plurality of tables A9, A10 based on the correspondence of the distance and the occupying ratio which differ depending on the width of the input straight line. In this case, the table to which a reference is made may be switched depending on the width of the input straight line which is judged by the judging means A2.

In this case, it is possible to prevent the color from thinning within a bold line due to the blending when the input straight line is the bold line. For this reason, it is possible to carry out a more accurate anti-aliasing process.

Figure 2:
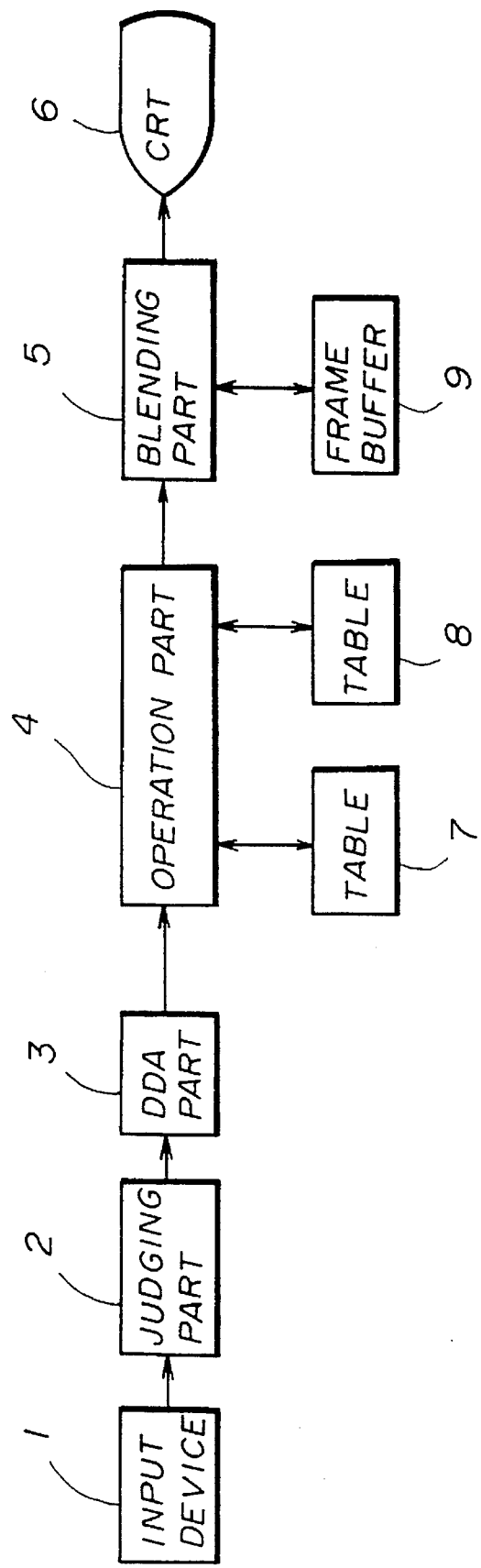
FIG. 2 is a system block diagram showing an embodiment of an anti-aliasing line display apparatus according to the present invention.

Next, a description will be given of an embodiment of the anti-aliasing line display apparatus according to the present invention. FIG. 2 shows the embodiment of the anti-aliasing line display apparatus.

The anti-aliasing line display apparatus shown in FIG. 2 includes an input device 1, a judging part 2, a digital differential analyzer (DDA) part 3, an operation part 4, a blending part 5, a display device 6, tables 7 and 8, and a frame buffer 9 which are coupled as shown. For example, the display device 6 is a cathode ray tube (CRT).

In FIG. 2, the input device 1 is a keyboard or a pointing device such as a mouse for specifying a point on a display screen. When carrying out a computer graphics process, the operator inputs predetermined data from this input device 1. In this embodiment, the predetermined data includes coordinate data related to a straight line which is to be displayed, data related to the attribute such as color, and the like.

The judging part 2 generates the straight line based on the coordinate data and the like of the straight line input from the input device 1, and judges the width and slope of the straight line which is to be displayed. The judging part 2 judges the width and slope of the straight line because the anti-aliasing process differs depending on the width and slope of the straight line as will be described later.

The DDA part 3 decomposes the straight line which is generated by the judging part 2 into individual pixels corresponding to the resolution of the display device 6, using a DDA. Pixels to be drawn on the display device 6, that is, drawing pixels, are determined by an analyzing process of the DDA part 3.

Figures 3A, 3B:
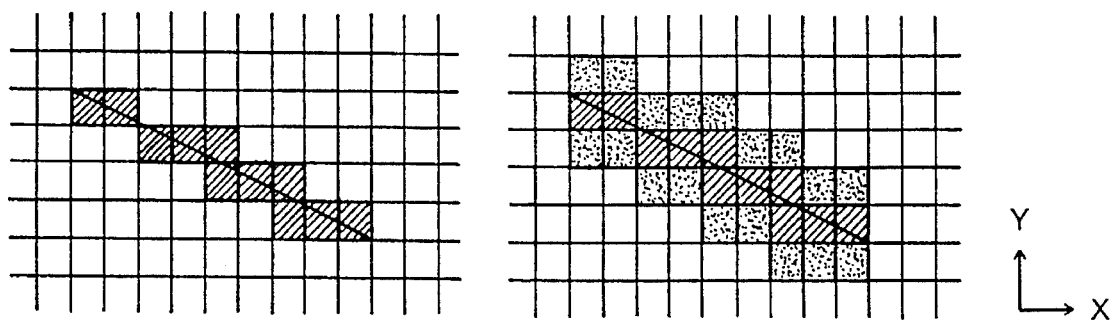
FIG. 3A shows a state where drawing pixels obtained as a result of the analysis of a conventional digital differential analyzer are drawn on a display.
FIG. 3B shows a state where drawing pixels are additionally drawn by a digital differential analyzer of the embodiment of the anti-aliasing line display apparatus.

FIG. 3A shows a state where the drawing pixels which are obtained as a result of the analyzing process of a conventional DDA are drawn on the display device 6. As may be seen from FIG. 3A, if the drawing pixels indicated by the hatching are merely obtained in correspondence with the straight line obtained by the judging part 2 and displayed, the straight line will not be displayed as a straight line and line segments having steps are displayed instead. In other words, the displayed line becomes jagged.

Hence, in this embodiment, the DDA part 3 draws in addition to each drawing pixel which is obtained as a result of the analyzing process of the DDA, one adjacent pixel which is adjacent to the drawing pixel along the up-and-down direction (vertical or Y-axis direction) or the right-and-left direction (horizontal of X-axis direction). Whether to increase the drawing pixel in the X-axis direction or the Y-axis direction is determined by the slope of the straight line.

In other words, based on the slope of the straight line obtained by the judging part 2, the drawing pixel is increased in the Y-axis direction if the length of the straight line in the X-axis direction is long (that is, the major axis or the longer axis is in the X-axis direction), and the drawing pixel is increased in the X-axis direction if the length of the straight line in the Y-axis direction is long (that is, the major axis or the longer axis is in the Y-axis direction).

FIG. 3B shows a state where the drawing pixels are additionally drawn by the DDA part 3 of this embodiment. In FIG. 3B, the drawing pixels (hereinafter also referred to as reference drawing pixels) which are obtained similarly to the conventional DDA are indicated by the hatching. On the other hand, the drawing pixels (hereinafter also referred to as additional drawing pixels) which are additionally drawn by the DDA part 3 of this embodiment care indicated by the dot-shading. In this particular case shown in FIG. 3B, the slope of the straight line with respect to the X-axis direction, that is, the horizontal direction, is small. Hence, the additional drawing pixels are added in the Y-axis direction relative to the reference drawing pixels. By additionally drawing the additional drawing pixels, it is possible to draw on the display device 6 a smooth straight line only having very small steps. If the straight line does not have a slope and extends in the X-axis or Y-axis direction, the aliasing is not generated with respect to such a straight line and no additional drawing pixels need to be drawn.

Figure 4:
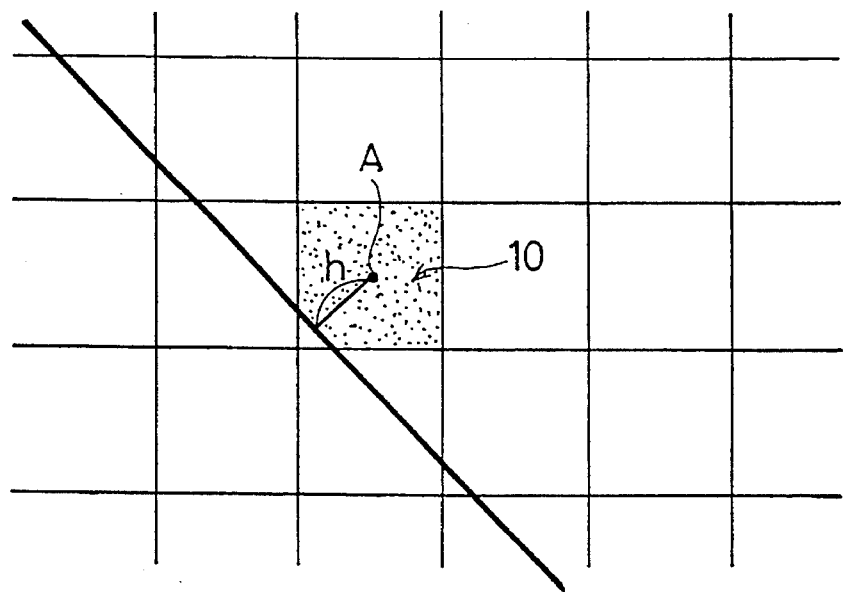
FIG. 4 is a diagram for explaining a distance h between a straight line and a drawing pixel.

The operation part 4 computes a distance h between the straight line which is obtained in the judging part 2 and the drawing pixel which is obtained in the DDA part 3. As shown in FIG. 4, this distance h is the distance between a center point A of a drawing element 10 indicated by the dot-shading and a straight line 11 in a direction perpendicular to the straight line 11. In other words, the distance h is the normal distance between the straight line 11 and the center point A of the drawing pixel 10. The calculation of the distance between the center point A and the straight line 11 is made with respect to all of the reference drawing pixels and the additional drawing pixels obtained in the DDA part 3.

When the normal distance h with respect to the straight line 11 is computed for all of the drawing pixels and the additional drawing pixels, an occupying ratio of the straight line 11 with respect to each drawing pixel is then obtained based on the distance h. The occupying ratio is the ratio of the drawing pixel occupied by the straight line 11.

Figure 5A:
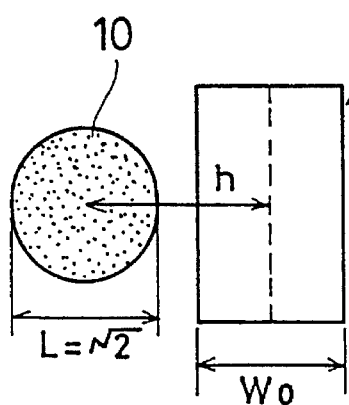
FIGS. 5A, 5B and 5C respectively are diagrams for explaining an occupying ratio.
Figure 5B:
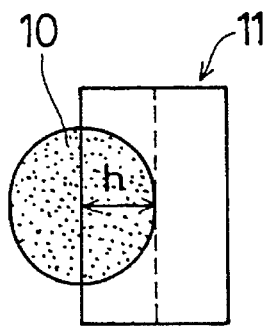
Figure 5C:
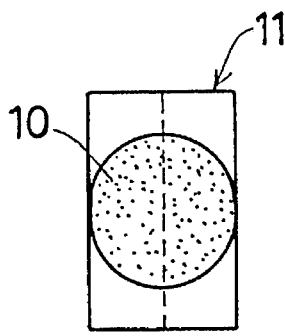

The occupying ratio will now be described with reference to FIGS. 5A through 5C. In FIGS. 5A through 5C, it is assumed for the sake of convenience that a circular drawing pixel 10 has a diameter L satisfies L=√2 and that the straight line 11 has a width $W_0$.

In the state shown in FIG. 5A, the distance h satisfies $h \geq (\sqrt{2}+W_0)/2$, and the drawing pixel 10 and the straight line 11 are separated. In this state shown in FIG. 5A, the occupying ratio is 0%.

On the other hand, in a state shown in FIG. 5B, the distance h satisfies $h=(\sqrt{2}+W_0)/2$. In this state shown in FIG. 5B, the occupying ratio is 50%.

Furthermore, in a state shown in FIG. 5C, the distance h satisfies h=0 (and $W_0=\sqrt{2}$ in this example). In this state shown in FIG. 5C, the occupying ratio is 100%.

Accordingly, the occupying ratio which is the ratio of the straight line 11 occupying each drawing pixel has a correlation to the normal distance h, and can thus be obtained based on the normal distance h.

However, if the distance h from the straight line 11 to every one of the reference drawing pixels and the additional drawing pixels were to be obtained in the DDA part 3 and the occupying ratio of the straight line 11 were to be calculated with respect to the individual drawing pixels based on each distance h, the amount of calculation required to obtain the occupying ratios would become extremely large. As a result, an extremely long calculation time would be required, and real-time processing of the anti-aliasing process would not be possible.

Hence, in this embodiment, notice is given to the fact that the occupying ratio and the distance h have the correlation. In other words, this embodiment uses the distance h has an index, and prepares in advance the tables 7 and 8 which prestore the occupying ratio for each distance d. When obtaining the occupying ratio of the straight line 11 with respect to the drawing pixel, a reference is made to the tables 7 and 8. By referring to the tables 7 and 8 when obtaining the occupying ratio, it becomes unnecessary to calculate the occupying ratio with respect to the individual drawing pixels, and the calculation of the occupying ratio can be made within a short time. As a result, the time required for the anti-aliasing process is effectively reduced, and it becomes possible to carry out a real-time processing of the anti-aliasing process.

The two tables 7 and 8 are used for the following reasons. In other words, the kind of table used when obtaining the occupying ratio is different depending on the width of the straight line 11.

Figure 6A:
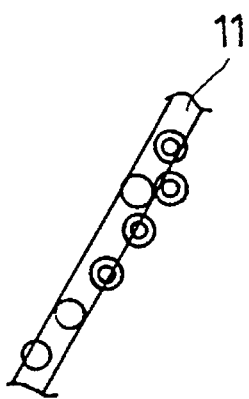
FIGS. 6A and 6B respectively are diagrams for explaining the relationship of straight lines having different widths and the drawing pixels.
Figure 6B:
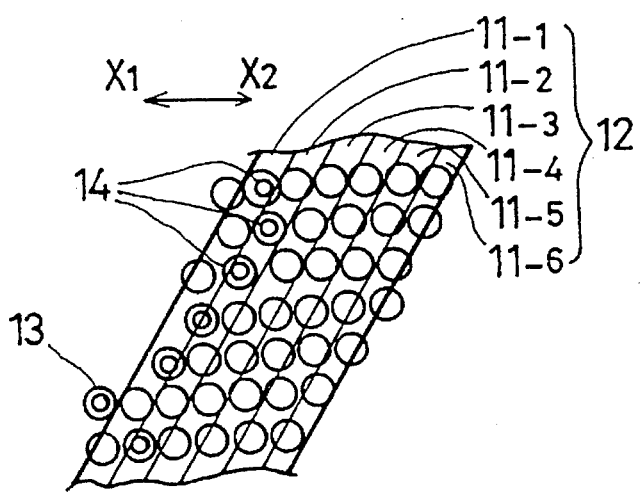

FIGS. 6A and 6B respectively show the relationship of the drawing pixel and the straight lines having different widths.

FIG. 6A shows a case where the width of the straight line 11 is approximately the same as the diameter of one drawing pixel. In FIG. 6A, it is assumed for the sake of convenience that the width of the straight line 11 is "1" and the diameter of the drawing pixel is also "1". The drawing pixels indicated by double circles in FIG. 6A are separated from the straight line 11, and thus, the occupying ratio of such drawing pixels is less than 100%. With respect to such drawing pixels for which the occupying ratio is less than 100%, the blending part 5 which will be described later makes a more faded coloring in correspondence with this occupying ratio when compared to the coloring of the drawing pixel for which the occupying ratio is 100%. By carrying out such a coloring process, it becomes possible to draw a smoother straight line so that the jagged portion will not appear conspicuous.

On the other hand, FIG. 6B shows a case where a width W of a straight line (that is, a bold line) 12 satisfies W>1, where the drawing pixels have a diameter "1". In this case, the following problems will occur if the process is made identical to that carried out for the case shown in FIG. 6A where the width of the straight line 11 is "1".

In FIG. 6B, the bold line 12 may be defined as a group of fine lines 11-1 through 11-6 each having a width "1". Hence, the calculation of the occupying ratio can be made in units of the fine lines 11-1 through 11-6. For example, in the case of the fine line 11-1, no problems will occur when the process carried out for the case shown in FIG. 6A is also carried out with respect to a drawing pixel 13 which is located outside of the bold line 12. However, problems will occur if the process carried out for the case shown in FIG. 6A is also carried out with respect to a drawing pixel 14 which is located inside the bold line 12.

In other words, if the process described above is carried out with respect to the drawing pixel 14 which is located inside the bold line 12, a faded coloring is made even though the drawing pixel 14 is located inside the bold line 14 and the coloring of the bold line 12 becomes non-uniform.

Hence, in this embodiment, a judgement is made to determine whether or not the straight line to be drawn is s bold line. If the straight line to be drawn is a bold line, the table which is provided shows an occupying ratio of 100% with respect to the drawing pixel which is inside the bold line regardless of the distance h. Hence, the value of the table which is referred to differs depending on whether the straight line to be drawn is a fine line or a bold line, and this embodiment provides two tables 7 and 8.

Figure 7A:
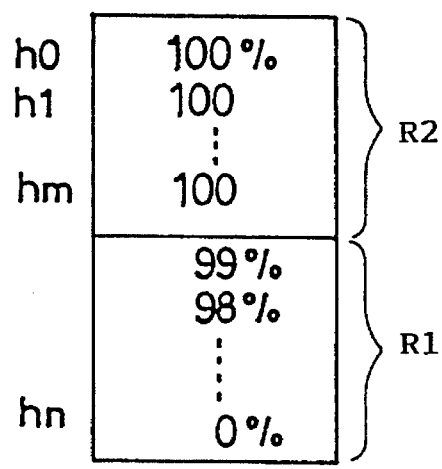
FIG 7A is a diagram showing a table used when drawing a bold staight line.
Figure 7B:
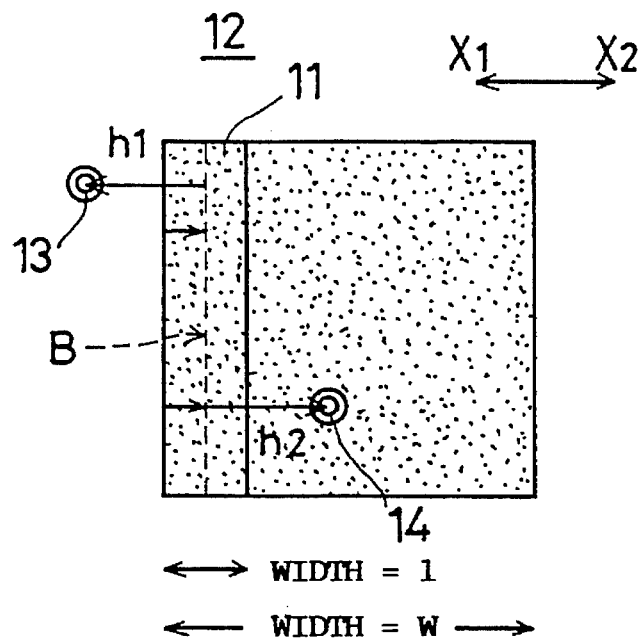
FIG. 7B is a diagram for explaining the relationship of the bold straight line and the table.

FIGS. 7A and 7B are diagrams for explaining the table 8 when the straight line to be drawn is a bold line and for explaining the relationship of the bold line and the table 8. FIG. 7A shows the table 8, and FIG. 7B shows the bold line 12.

If attention is paid to the fine line 11 which forms the bold line 12, is located at the end portion in a direction $X_1$ in FIG. 7B and has a width W satisfying W=1, the table 8 is generally divided into two regions R1 and R2 shown in FIG. 7A between the drawing pixel 13 which exists in the direction $X_1$ in FIG. 7B relative to a center line B of the fine line 11 indicated by a dotted arrow and the drawing pixel 14 which exists in a direction $X_2$ in FIG. 7B relative to the center line B of the fine line 11.

In other words, if the drawing pixel 13 for which the occupying ratio is to be obtained exists in the direction $X_1$ relative to the center line B in FIG. 7B, a value in the region R2 of the table 8 shown in FIG. 7A is looked up to determine the occupying ratio. On the other hand, if the drawing pixel 14 for which the occupying ratio is to be obtained exists in the direction $X_2$ in FIG. 7B, that is, exists inside the bold line 12, a value in the region R1 of the table 8 is looked up to determine the occupying ratio. In this latter case where the value in the region R1 of the table 8 is looked up, the occupying ratio is forcibly set to 100%.

By use of the table 8 having the above described structure, the occupying ratio of the bold line 12 with respect to the drawing pixel 14 existing inside the bold line 12 always becomes 100% regardless of a distance $h_2$. Hence, the bold line 12 will not be colored non-uniformly, and it is possible to satisfactorily draw the bold line 12. In addition, because the occupying ratio for both the side portions is determined by referring to the value in the region R2 of the table 8 shown in FIG. 7B, it is possible to satisfactorily draw a smooth straight line which is subjected to the anti-aliasing process.

The description above is given for the fine line 11 existing on the end along the direction $X_1$ in FIG. 7B. However, the process is carried out similarly for the fine line existing on the other end along the direction $X_2$ in FIG. 7B, and a description of this process will be omitted in this specification.

When the occupying ration with respect to the drawing pixel is computed by the operation part 4 as described above, the blending part 5 shown in FIG. 2 blends the color of the pixel and the color of the frame buffer 9 based on the occupying ratio and draws the blended color on the display device 6. In this embodiment, the distance h is obtained with respect to all of the reference drawing pixels and the additional drawing pixels obtained by the DDA part 3, and the anti-aliasing process is carried out by obtaining the occupying ratio based on the distance h. As a result, it is possible to draw a straight line which is smooth with a high quality.

Next, a description will be given of the process of this embodiment of the anti-aliasing line display apparatus, by referring to FIGS. 8 through 10.

Figure 8:
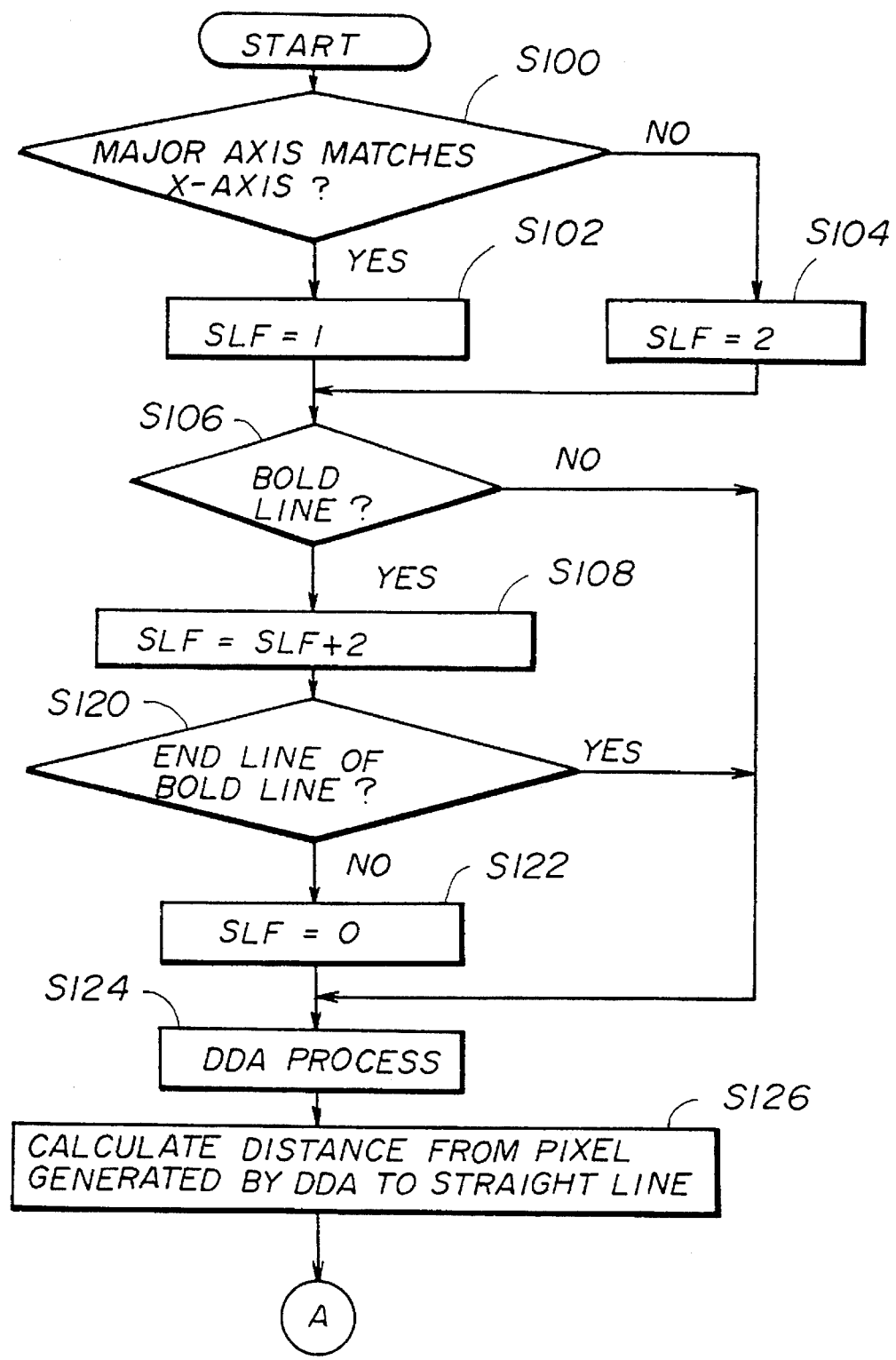
FIG. 8 is a flow chart for explaining a portion of a process of the embodiment of the anti-aliasing line display apparatus.
Figure 9:
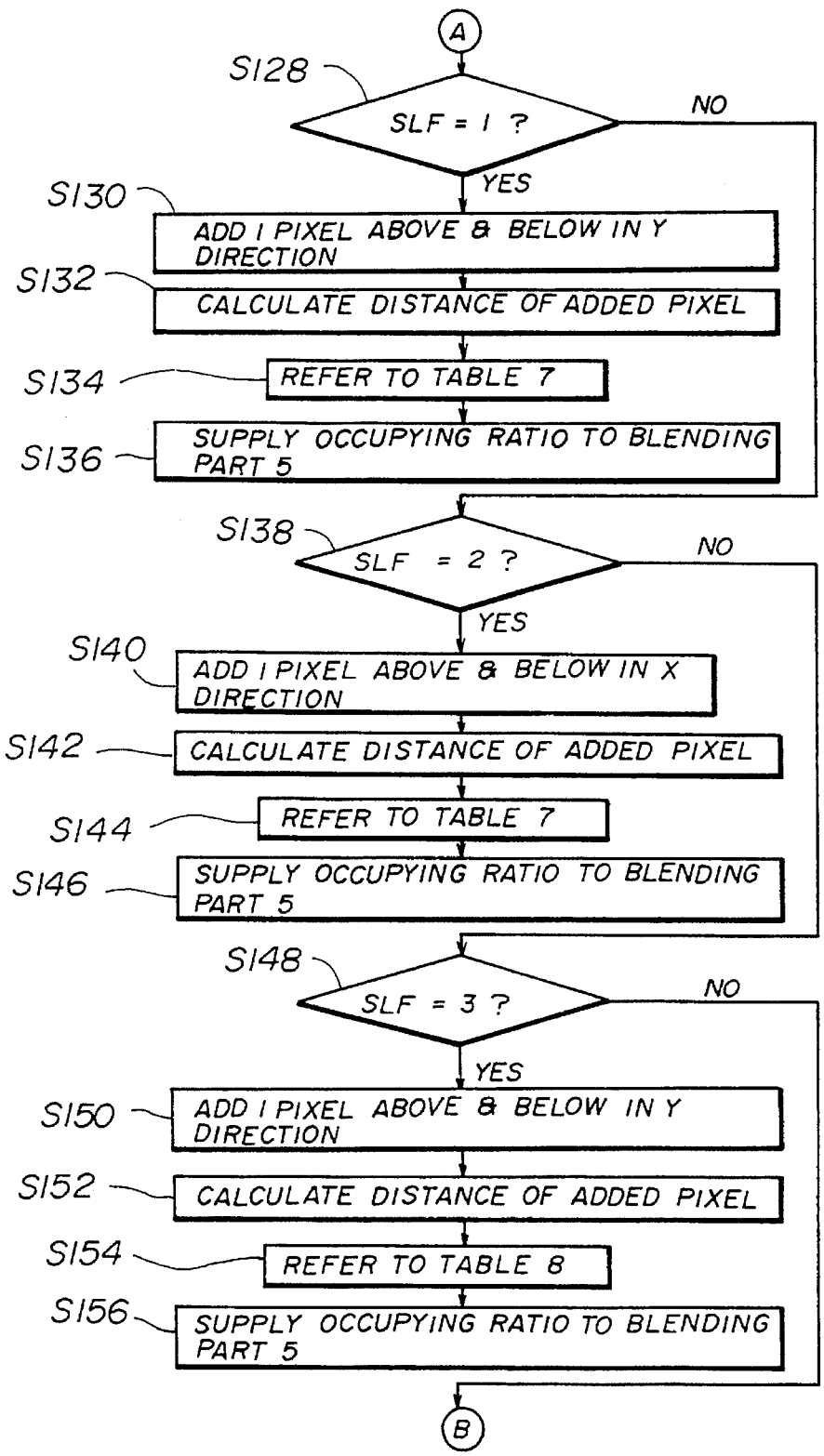
FIG. 9 is a flow chart for explaining another portion of the process of the embodiment of the anti-aliasing line display apparatus.
Figure 10:
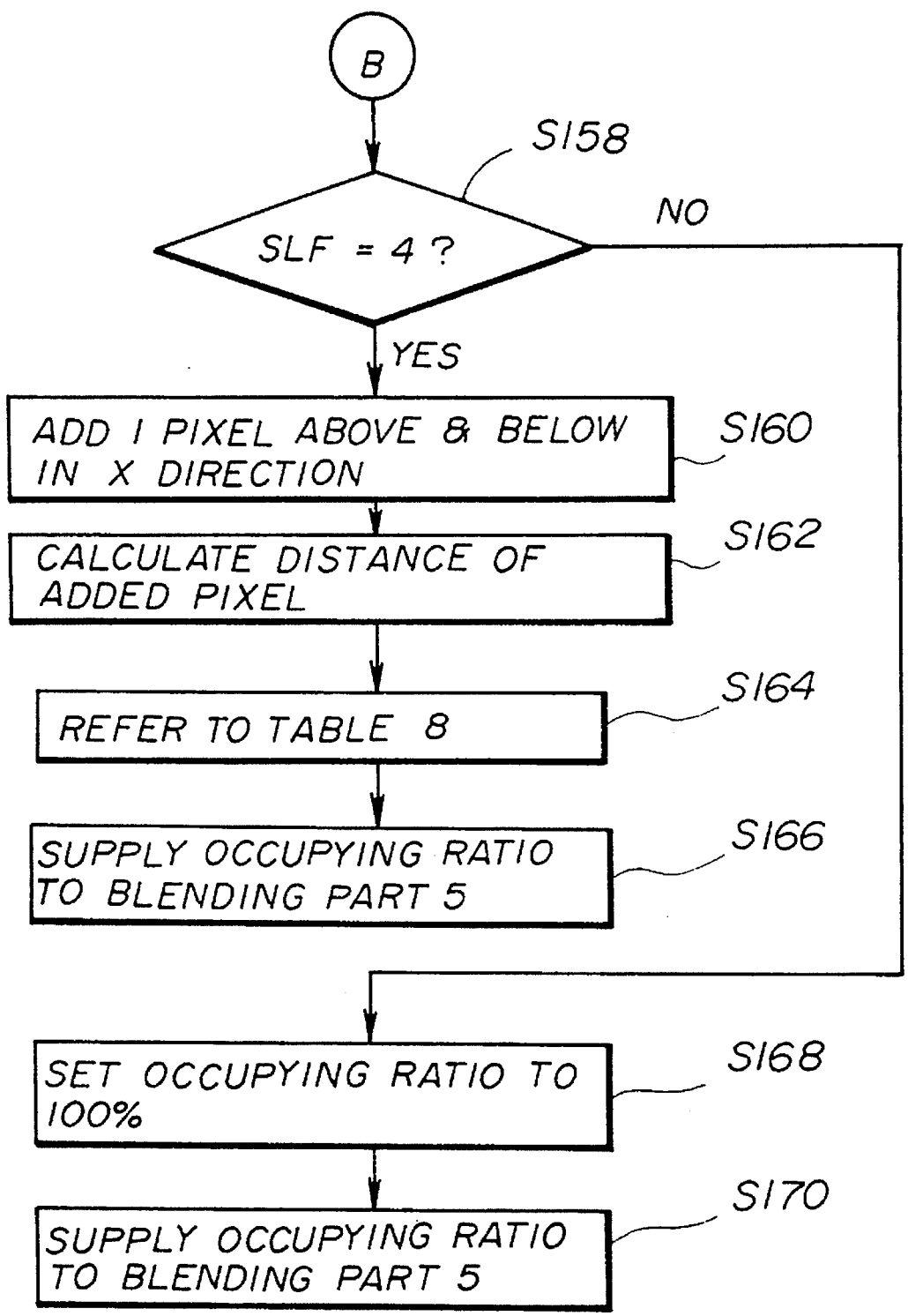
FIG. 10 is a flow chart for explaining still another portion of the process of the embodiment of the anti-aliasing line display apparatus.

When the process shown in FIGS. 8 through 10 is started, a step S100 decides whether or not the major axis of an input straight line extends in the X-axis direction, based on the coordinate data input from the input device 1. If the decision result in the step S100 is YES, a step S102 sets a straight line flag SLF to "1". On the other hand, a step S104 sets the straight line flag SLF to "2" if the decision result in the step S100 is NO.

After the step S102 or S104, a step S106 decides whether or not the input straight line is a bold line, that is, whether or not the width W of the input straight line is other than "1" (or W>1). If the input straight line is a bold line and the decision result in the step S106 is YES, the process advances to a step S108. The step S108 adds "2" to the straight line flag SLF which is set in the step S102 or S104 to obtain a new straight line flag SLF. Then, a step S120 decides whether or not the straight line to be processed corresponds to an end line of a bold line. If the decision result in the step S120 is NO, a step S122 resets the straight line flag SLF to "0" regardless of the processes of the steps S102, S104 and S108. A following step S124 is carried out if the decision result in the step S106 is NO, the decision result in the step S120 is YES, or after the process S122 is carried out.

Therefore, the following cases occur depending on the characteristic of the straight line which is to be drawn when the processes of the steps S100 through S122 described above are carried out.

1) The straight line flag SLF is equal to "1" if the length of the straight line which is to be drawn is longer in the X-axis direction and is a fine line having a width W satisfying W=1.
2) The straight line flag SLF is equal to "2" if the length of the straight line which is to be drawn is longer in the Y-axis direction and is a fine line satisfying W>1.
3) The straight line flag SLF is equal to "3" if the length of the straight line which is to be drawn is longer in the X-axis direction and is a bold line having a width W satisfying W>1.
4) The straight line flag SLF is equal to "4" if the length of the straight line which is to be drawn is longer in the Y-axis direction and is a bold line satisfying W>1.
5) The straight line flag SLF is equal to "0" if the straight line which is to be drawn is other than both end portions of a bold line satisfying W>1.

The above described processes of the steps S100 through S122 are carried out by the judging part 2 shown in FIG. 2.

After the processes of determining the above cases 1) through 5) for the straight line to be drawn end, the process advances to the step S124 shown in FIG. 8. This step S124 carries out an analyzing process using the DDA part 3. More particularly, the straight line generated in the judging part 2 is decomposed into individual pixels using the DDA and the reference drawing pixels are set. A step S126 which follows obtains a distance h between the straight line and the reference drawing pixel and the additional drawing pixel obtained in the step S124.

Thereafter, a step S128 shown in FIG. 9 decides whether or not the straight line flag SLF obtained by the processes of the steps S100 through S122 is equal to "1". As described above, if SLF=1, the length of the straight line which is to be drawn is longer in the X-axis direction and is a fine line satisfying W=1. Hence, if the decision result in the step S128 is YES, a step S130 sets one pixel above and one pixel below along the Y-axis direction as the additional drawing pixels, and a step S132 calculates the distance between the straight line and each additional drawing pixel. Then, a step S134 refers to the table 7 which is used for the fine line, based on the distance between the straight line and each of the reference drawing pixels and the additional drawing pixels set in the DDA part 3, so as to obtain the occupying ratio of the straight line with respect to each of the drawing pixels. A step S136 supplies the occupying ratio obtained by the step S134 to the blending part 5 shown in FIG. 2.

On the other hand, if SLF is not equal to "1" and the decision result in the step S128 is NO, a step S138 decides whether or not SLF=2. As described above, if SLF=2, the length of the straight line which is to be drawn is longer in the Y-axis direction and is a fine line satisfying W=1. Hence, if the decision result in the step S138 is YES, a step S140 sets one pixel above and one pixel below along the X-axis direction as the additional drawing pixels, and a step S142 calculates the distance between the straight line and each additional drawing pixel. Then, a step S144 refers to the table 7 which is used for the fine line, based on the distance between the straight line and each of the reference drawing pixels and the additional drawing pixels set in the DDA part 3, so as to obtain the occupying ratio of the straight line with respect to each of the drawing pixels. A step S146 supplies the occupying ratio obtained by the step S144 to the blending part 5.

Further, if the decision result in the step S138 is NO, a step S148 decides whether or not SLF=3. As described above, if SLF=3, the length of the straight line which is to be drawn is longer in the X-axis direction and is a bold line satisfying W>1. Hence, if the decision result in the step S148 is YES, a step S150 sets one pixel above and one pixel below along the Y-axis direction as the additional drawing pixels, and a step S152 calculates the distance between the straight line and each additional drawing pixel. Then, a step S154 refers to the table 8 which is used for the bold line, based on the distance between the straight line and each of the reference drawing pixels and the additional drawing pixels set in the DDA part 3, so as to obtain the occupying ratio of the straight line with respect to each of the drawing pixels. A step S156 supplies the occupying ratio obtained by the step S154 to the blending part 5.

On the other hand, if the decision result in the step S148 is NO, a step S158 shown in FIG. 10 decides whether or not SLF=4. As described above, if SLF=4, the length of the straight line which is to be drawn is longer in the Y-axis direction and is a bold line satisfying W>1. Hence, if the decision result in the step S158 is YES, a step S160 sets one pixel above and one pixel below along the X-axis direction as the additional drawing pixels, and a step S162 calculates the distance between the straight line and each additional drawing pixel. Then, a step S164 refers to the table 8 which is used for the bold line, based on the distance between the straight line and each of the reference drawing pixels and the additional drawing pixels set in the DDA part 3, so as to obtain the occupying ratio of the straight line with respect to each of the drawing pixels. A step S166 supplies the occupying ratio obtained by the step S164 to the blending part 5.

On the other hand, if the decision result in the step S158 is NO, a step S168 sets the occupying ratio of the straight line with respect to each reference drawing pixel which has been set to 100%, and a step S170 supplies this occupying ratio to the blending part 5.

Figure 11:
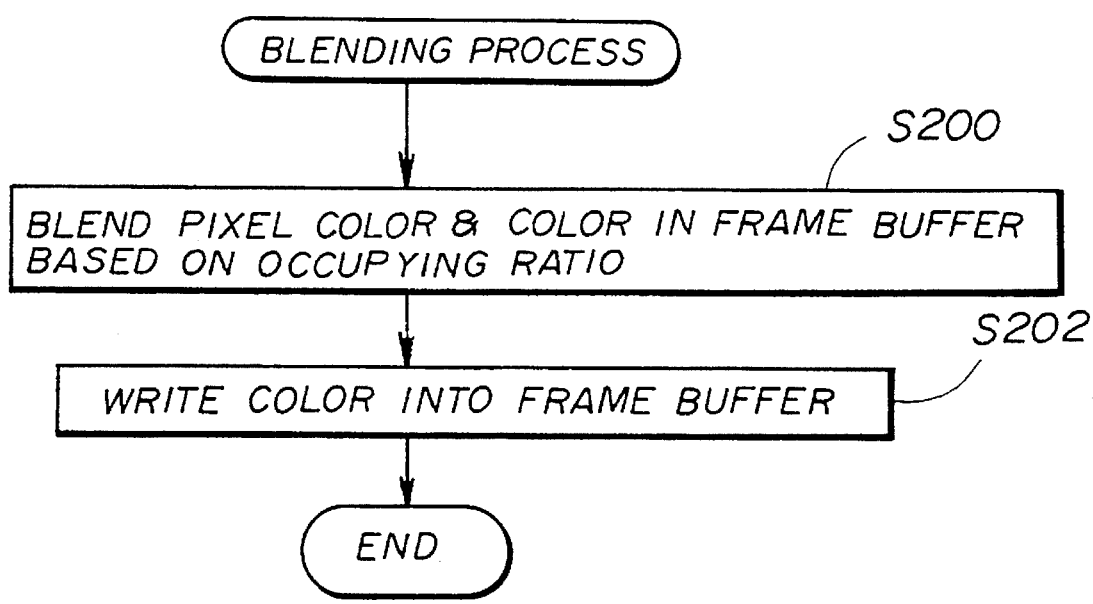
FIG. 11 is a flow chart for explaining another process of the embodiment of the anti-aliasing line display apparatus.

FIG. 11 shows a process carried out by the blending part 5 when the occupying ratio is received as a result of the processes shown in FIGS. 8 through 10.

When the process of the blending part starts in FIG. 11, a step S200 blends (or mixes) the pixel color of each pixel and the color of the frame buffer 9 based on the received occupying ratio. Then, a step S202 writes the blended color obtained by the step S200 into the frame buffer 9. The display device 6 shown in FIG. 2 displays the blended color written in the frame buffer 9. Therefore, it is possible to obtain an image having a high quality because a smooth straight line having virtually no jagged portions can be drawn by the above described processes.

Further, the present invention is not limited to these embodiments, but various variations and modifications may be made without departing from the scope of the present invention.

What is claimed is:

1. An anti-aliasing line display apparatus comprising:

an input means for inputting a coordinate and an attribute of a straight line which is to be displayed;

judging means for judging a width and a slope of the input straight line;

analyzing means for decomposing the input straight line into individual pixels and setting a drawing pixel to be drawn;

distance calculating means for calculating a distance from a center of the drawing pixel set by the analyzing means to the input straight line;

occupying ratio calculating means for calculating an occupying ratio of the input straight line with respect to the drawing pixel based on the distance calculated by the distance calculating means and the width judged by said judging means;

frame buffer means input with a color in advance;

blending means for blending a color of the drawing pixel and the color input in the frame buffer means in advance based on the occupying ratio, and for writing the blended color in the frame buffer means; and display means for displaying the input straight line based on the color of the drawing pixel written in the frame buffer means.

2. The anti-aliasing line display apparatus as claimed in claim 1, wherein said analyzing means sets as the drawing pixel, in addition to the pixel generated based on the input coordinate, an adjacent pixel depending on the slope of the input straight line judged by the judging means, and said occupying ratio calculating means calculates the occupying ratio also with respect to the adjacent pixel.

3. The anti-aliasing line display apparatus as claimed in claim 2, wherein said occupying ratio calculating means includes table means which uses as an index the distance from the center of the drawing pixel to the input straight line, and said table means prestores the occupying ratio in correspondence with the distance.

4. The anti-aliasing line display apparatus as claimed in claim 3, wherein said occupying ratio calculating means obtains the occupying ratio of the input straight line with respect to the drawing pixel based on the distance by making a reference to the table means.

5. The anti-aliasing line display apparatus as claimed in claim 1, wherein said occupying ratio calculating means includes table means which uses as an index the distance from the center of the drawing pixel to the input straight line, and said table means prestores the occupying ratio in correspondence with the distance.

6. The anti-aliasing line display apparatus as claimed in claim 5, wherein said occupying ratio calculating means obtains the occupying ratio of the input straight line with respect to the drawing pixel based on the distance by making a reference to the table means.

7. The anti-aliasing line display apparatus as claimed in claim 1, wherein said occupying ratio calculating means includes a plurality of tables based on a correspondence of the distance and the occupying ratio which differ depending on a width of the input straight line.

8. The anti-aliasing line display apparatus as claimed in claim 7, wherein said occupying ratio calculating means switches the table to which a reference is made depending on the width of the input straight line which is judged by said judging means.

9. The anti-aliasing line display apparatus as claimed in claim 1, wherein said distance calculating means calculates the distance from the center of the drawing pixel to the input straight line along a direction perpendicular to the input straight line.

10. An anti-aliasing line display apparatus comprising:

an input means for inputting a coordinate and an attribute of a straight line which is to be displayed;

judging means for judging a width and a slope of the input straight line;

analyzing means for decomposing the input straight line into individual pixels and setting a drawing pixel to be drawn;

distance calculating means for calculating a distance from a center of the drawing pixel set by the analyzing means to the input straight line;

occupying ratio calculating means, including table means indicating a corresponding relationship between distances and occupying ratios of the input straight line with respect to the drawing pixel for various widths of the input straight line, for calculating an occupying ratio of the input straight line by looking up the table means based on the distance calculated by the distance calculating means and the width of the input straight line judged by said judging means;

frame buffer means input with a color in advance;

blending means for blending a color of the drawing pixel and the color input in the frame buffer means in advance based on the occupying ratio and for writing the blended color in the frame buffer means; and display means for displaying the input straight line based on the color of the drawing pixel written in the frame buffer means.

11. The anti-aliasing line display apparatus as claimed in claim 10, wherein said distance calculating means calculates the distance from the center of the drawing pixel to the input straight line along a direction perpendicular to the input straight line.

* * * * *